United States Patent
Maneri et al.

(10) Patent No.: US 11,900,528 B2
(45) Date of Patent: Feb. 13, 2024

(54) METHOD AND SYSTEM FOR VIEWING AND MANIPULATING INTERIORS OF CONTINUOUS MESHES

(71) Applicant: Unity IPR ApS, Copenhagen (DK)

(72) Inventors: Andrew Peter Maneri, Bellevue, WA (US); Donnavon Troy Webb, Sammamish, WA (US); Jonathan Randall Newberry, Hayward, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/332,935

(22) Filed: May 27, 2021

(65) Prior Publication Data

US 2021/0375028 A1  Dec. 2, 2021

Related U.S. Application Data

(60) Provisional application No. 63/030,790, filed on May 27, 2020.

(51) Int. Cl.
*G06T 15/20* (2011.01)
*G06T 7/73* (2017.01)
*G06T 17/20* (2006.01)

(52) U.S. Cl.
CPC .............. *G06T 15/20* (2013.01); *G06T 7/75* (2017.01); *G06T 17/205* (2013.01); *G06T 2207/10028* (2013.01)

(58) Field of Classification Search
CPC .......... G06T 15/20; G06T 15/30; G06T 7/70; G06T 7/73; G06T 7/75
See application file for complete search history.

(56) References Cited

U.S. PATENT DOCUMENTS

| | | | | |
|---|---|---|---|---|
| 5,276,785 A | * | 1/1994 | Mackinlay | G06T 15/20 345/427 |
| 2010/0265248 A1 | * | 10/2010 | McCrae | G06T 15/205 715/850 |
| 2011/0094184 A1 | * | 4/2011 | Gu | G08B 7/066 340/628 |
| 2019/0385373 A1 | * | 12/2019 | Mittleman | G06T 15/20 |

OTHER PUBLICATIONS

Cohen-Or, Daniel, et al. "A survey of visibility for walkthrough applications." IEEE Transactions on Visualization and Computer Graphics 9.3 (2003): 412-431. (Year: 2003).*

* cited by examiner

*Primary Examiner* — Diane M Wills
(74) *Attorney, Agent, or Firm* — Schwegman Lundberg & Woessner, P.A.

(57) ABSTRACT

A method of rendering a view is disclosed. Three occlusion planes associated with an interior cavity of a three-dimensional object included in the view are created. The three occlusion planes are positioned based on a camera position and orientation. Any objects or parts of objects that are in a line of sight between the camera and any one of the three occlusion planes are culled. The view is rendered from the perspective of the camera.

20 Claims, 12 Drawing Sheets

CLIPPED     NOT CLIPPED     ROOM CENTER

METHOD AND SYSTEM FOR VIEWING AND MANIPULATING INTERIORS OF CONTINUOUS MESHES

CROSS-REFERENCE TO RELATED APPLICATIONS

This application claims the benefit of U.S. Provisional Application No. 63/030,790, filed May 27, 2020, entitled "METHOD AND SYSTEM FOR VIEWING AND MANIPULATING INTERIORS OF CONTINUOUS MESHES," which is incorporated by reference herein in its entirety.

TECHNICAL FIELD

The subject matter disclosed herein generally relates to the technical field of computer graphics systems, and in one specific example, to computer graphics systems and methods for rendering a view of cavities within digital objects.

BACKGROUND OF THE INVENTION

When viewing a 3d model of a building or environment, users frequently need to see inside rooms while maintaining a view of the outside so the entire environment can be seen at once. Such situations occur during augmented reality authoring, architecture previewing, gaming, or any time a 'bird's eye view' of a building and its contents are required. Software tools exist that allow a bird's eye view into a structure when the structures have labelled segments (such as 'wall' or 'ceiling') which can be easily ignored during rendering. For example, games and other software can fade out an occluding wall or turn off rendering of ceilings/extra floors so that users can look into rooms from above. However, existing methods do not work or produce poor results on large digital structures which are not segmented (e.g., such as large single mesh digital objects).

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1:
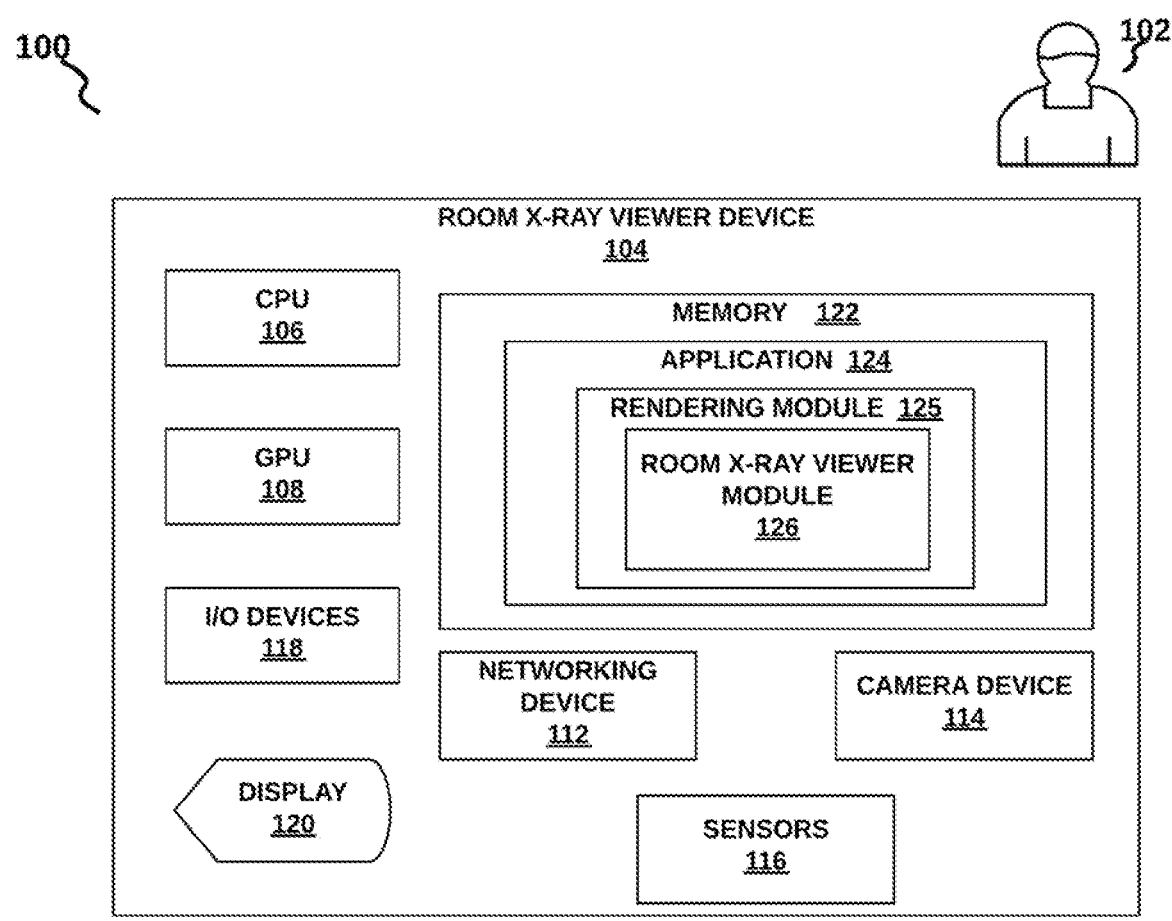
FIG. 1 is a schematic illustrating a room x-ray viewer system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D scene environments, 2D simulation environments, 2D content creation environments, and the like), 3D digital environments (e.g., 3D game environments, 3D simulation environments, 3D scene environments, 3D content creation environment, virtual reality environments, and the like), and augmented reality environments that include both a digital (e.g., virtual) component and a real-world component.

The term 'digital object' and '3D object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset' and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of rendering a view is disclosed. Three occlusion planes associated with an interior cavity of a three-dimensional object included in the view are created. The three occlusion planes are positioned based on a camera position and orientation. Any objects or parts of objects that are in a line of sight between the camera and any one of the three occlusion planes are culled. The view is rendered from the perspective of the camera.

The systems and methods described herein include one or more components or operations that are non-routine or unconventional individually or when combined with one or more additional components or operations, because, for example, they provide a number of valuable benefits when viewing a 3d model (e.g., 3D object) of a building or environment with a need to see inside rooms while maintaining a view from outside so a large part of the environment can be seen at once. This may happen during AR authoring, architecture previewing/work, video game development, or whenever a 'god's eye view' of a building and internal contents are needed. The methods and systems described herein can be used to peel away portions of occluding geometry (e.g., including walls, ceilings, and floors) to provide a continuous view into the environment and the 3D model.

Turning now to the drawings, systems and methods, including non-routine or unconventional components or operations, or combinations of such components or operations, for accumulated room x-ray viewing in accordance with embodiments of the invention are illustrated. In accordance with an embodiment, FIG. 1 is a diagram of an example room x-ray viewer system 100 and associated room x-ray viewer device 104 configured to provide room x-ray viewing functionality. In accordance with an embodiment, the room x-ray viewer device 104 is a computing device capable of providing a digital environment to a user 102. In some embodiments, the room x-ray viewer device 104 is a mobile computing device, such as a smartphone or a tablet computer, while in other embodiments, the room x-ray viewer device 104 is a computing device such as a desktop computer or workstation.

In accordance with an embodiment, the room x-ray viewer device 104 includes one or more central processing units (CPUs) 106 and graphics processing units (GPUs) 108. The processing device 104 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2, FIG. 3 FIG. 4, FIG. 5, FIG. 6, FIG. 7 and FIG. 8. The room x-ray viewer device 104 may also include one or more networking devices 112 (e.g., wired or wireless network adapters) for communicating across a network. The room x-ray viewer device 104 may also include one or more camera devices 114 which may be configured to capture digital video of the real world near the device 104. The room x-ray viewer device 104 may also include one or more sensors 116, such as a global positioning system (GPS) receiver (e.g., for determining a GPS location of the room x-ray viewer device 104), biometric sensors (e.g., for capturing biometric data of the user 102), motion or position sensors (e.g., for capturing position data of the user 102 or other objects), or an audio microphone (e.g., for capturing sound data). Some sensors 116 may be external to the room x-ray viewer device 104, and may be configured to wirelessly communicate with the room x-ray viewer device 104 (e.g., such as used in the Microsoft Kinect®, Vive Tracker™, MIT's Lidar sensor, or MIT's wireless emotion detector).

The room x-ray viewer device 104 also includes one or more input devices 118 such as, for example, a mouse, a keyboard, a keypad, a touch screen, a microphone, a pointing device, a camera, a hand-held device (e.g., hand motion tracking device), and the like, for inputting information in the form of a data signal readable by the processing device 106.

The room x-ray viewer device 104 further includes one or more display devices 120, such as a touchscreen of a tablet or smartphone, or lenses or visor of a VR or AR head mounted display (HMD), which may be configured to display virtual objects in conjunction with a real world view. The display device 120 may be driven or controlled by one or more GPUs 108. The GPU 108 processes aspects of graphical output that assists in speeding up rendering of output through the display device 120. In accordance with an embodiment, the room x-ray viewer device 104 may also include a visor (not shown) which acts as a "screen" or surface on which the output of the display device 120 appears, and through which a user experiences virtual content.

The room x-ray viewer device 104 also includes a memory 122 configured to store a room x-ray viewer module 126. The memory 122 can be any type of memory device, such as random access memory, read only or rewritable memory, internal processor caches, and the like. The memory also stores an application 124 (e.g., executed by the CPU 106 or GPU 108) that communicates with the display device 120 and also with other hardware such as the input/output device(s) 118 to present a digital environment (e.g., a 3D video game, a 3D content creation environment, a mixed reality display) on the display device 120. In accordance with an embodiment, the application 124 may be a digital content creation application that provides tools (e.g., user interfaces via the display device) for creating and viewing digital content including mixed reality content, video games, movies, tv shows and more. In accordance with an embodiment, the application 124 may include a rendering module 125 for rendering parts of a digital environment into an image or series of images (e.g., as part of a movie). In accordance with an embodiment, the application 124 may include a room x-ray viewer module 126 that performs operations as described below with respect to FIG. 2, FIG. 3, FIG. 4, FIG. 5, FIG. 6, FIG. 7 and FIG. 8. Although the room x-ray viewer module 126 is shown as a part of the rendering module 125 and the application 124, the room x-ray viewer module 126 may be implemented separately from the application 124 or separately from the rendering module 125 (e.g., as a plugin or as a separate application).

In some embodiments, the room x-ray viewer system 100 and the various associated hardware and software components described herein may provide augmented reality (AR) content instead of, or in addition to, virtual reality (VR) content (e.g., in a mixed reality (MR) environment). It should be understood that the systems and methods described herein may be performed with AR content and VR content, and as such, the scope of this disclosure covers both AR and VR applications. In an example embodiment, a user (e.g., a wearer of an HMD, or someone holding a smartphone, tablet, or other MR-capable device) experiences the MR environment as presented by the application 124 via a room x-ray viewer device 104. The MR environment includes a view of the real world (e.g., immediate surroundings of the device 104) along with displayed virtual content provided by the room x-ray viewer system 100. The room x-ray viewer device 104, in some embodiments, includes a forward-facing camera configured to capture digital video or images of the real world around the device 104, optionally including depth data, which the room x-ray viewer system 100 may analyze to provide some of the room x-ray viewer features described herein.

Figure 2:
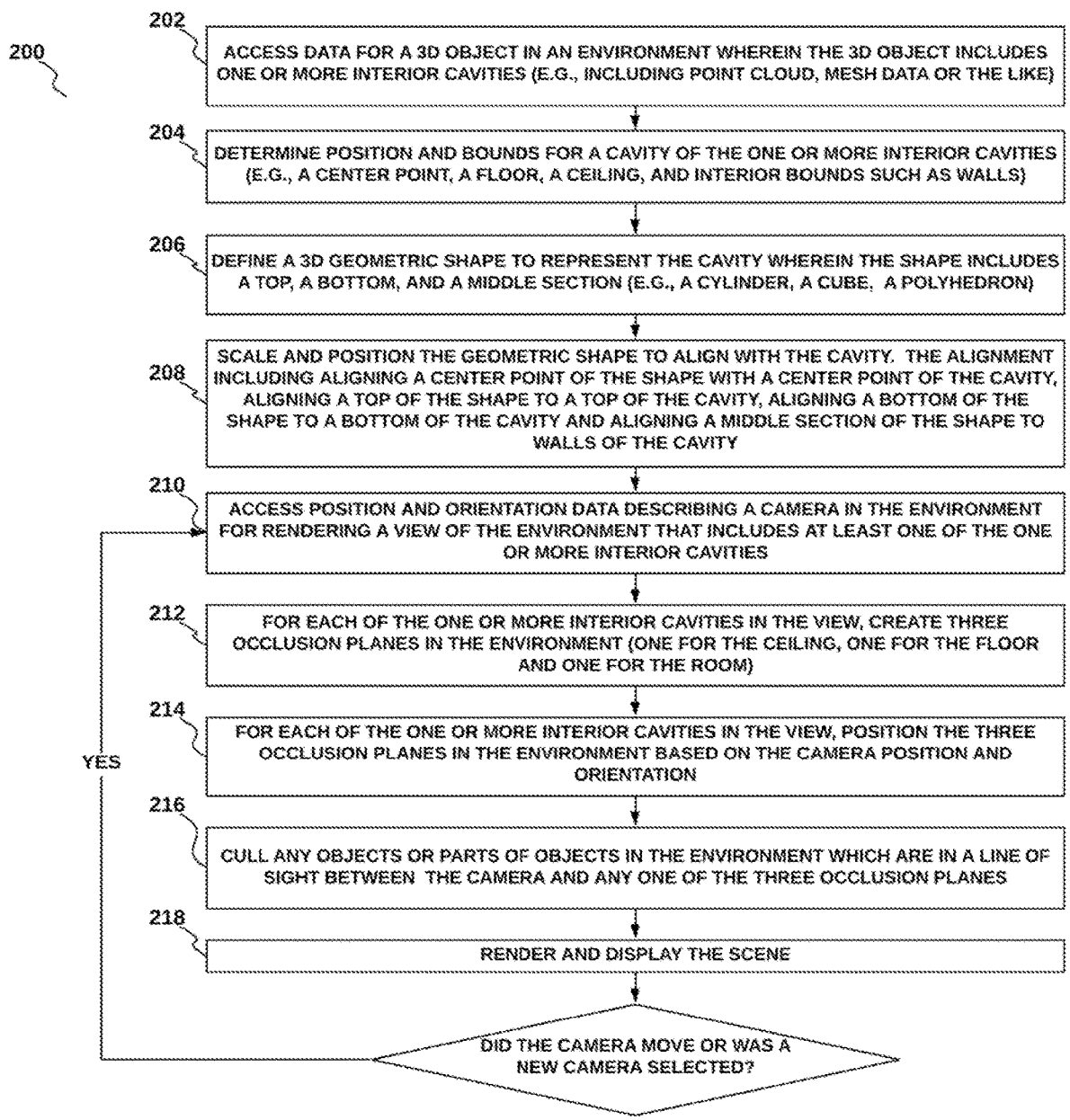
FIG. 2 is a flowchart of a method for viewing a cavity within a 3D digital structure using a room x-ray viewer system, in accordance with one embodiment.

In accordance with an embodiment, FIG. 2 shows a method 200 for providing a view into a cavity within a 3D digital structure. In accordance with an embodiment, the method may be performed by the room x-ray viewer module 126 within an environment (e.g., a 3D digital content creation environment, a 3D game environment, or a mixed reality environment). In various embodiments, some of the method elements shown may be performed concurrently, in a different order than shown, or may be omitted. In accordance with an embodiment, at operation 202 of the method 200, the room x-ray viewer module 126 accesses (e.g., receives, retrieves) data describing a 3D object in the environment, wherein the 3D object includes one or more interior cavities. The one or more interior cavities may be of any regular or irregular shape and size. The 3D object may be composed of a plurality of smaller 3D objects (e.g., as a grouped set of 3D objects) which may have additional interior cavities. For example, the 3D object may be a house composed of a plurality of smaller 3D objects such as rooms, hallways, walls, floors, doors, chairs, lights, and the like. The interior cavities may be rooms within the house. In accordance with an embodiment, the room x-ray viewer module 126 may actively retrieve the data from a memory (e.g., a local memory or a memory accessible via a network). In accordance with an embodiment, the 3D object may be a single large digital object with multiple cavities which may be described by a single large digital mesh or point cloud. Such a single large mesh (or point cloud) may be obtained from a scan of a real-world structure such as a building. The scan could be an infra-red based LIDAR scan, or a visible light based scan, or the like. The 3D object may or may not include metadata defining (e.g., labeling) the object or the cavities therein.

In accordance with an embodiment, at operation 204 of the method 200, the room x-ray viewer module 126 determines a position and bounds for a cavity of the one or more interior cavities. For example, the room x-ray viewer module 126 may determine a center point of the cavity, and bounds for the cavity, the bounds including a floor (or bottom) for the cavity, a ceiling (or top) for the cavity, and interior horizontal bounds of the cavity such as walls. The center point relating to a position of the cavity within the environment. In accordance with an embodiment, the determining of the center point position and bounds may include accessing data describing a position and bounds for the cavity from within metadata associated with the 3D object that includes the cavity. The metadata describing the cavity may be created by a developer during creation of the 3D object (e.g., by creating and labeling bounds). In accordance with an embodiment, the metadata describing the cavity may be created by a user operating the room x-ray viewer device 104 (e.g., by placing and sizing a digital cube to represent the cavity bounds). In accordance with another embodiment, the determining of the center point position and bounds may include analyzing the data describing the 3D object to extract the position and bounds. For example, an algorithm for extracting data from a 3D point cloud or a 3D mesh may be used to determine the position and bounds of the cavity (e.g., by fitting a cube to the cavity). An example cavity is described below with respect to FIG. 5.

In accordance with an embodiment, at operation 206 of the method 200, the room x-ray viewer module 126 may determine a type of 3D geometric shape to represent the cavity based on the determined bounds. In accordance with an embodiment, the type of 3D geometric shape may be chosen manually by a user of the room x-ray viewer device 104 (e.g., via options displayed on a user interface by the room x-ray viewer module 126). In accordance with an embodiment, the type of 3D geometric shape is predetermined (e.g., by a developer). For example, the room x-ray viewer module 126 may be predetermined to use a cylinder to represent all cavities, or in another embodiment, the module 126 may be predetermined to use a cube to represent all cavities. The type of 3D geometric shape may include any 3D geometric shape that includes three sections, wherein the sections include a top, a bottom and a middle section. The 3D geometric shape includes, but is not limited to a cylinder, a cube, any polyhedron, and more. The geometric shape may be used to simplify a representation of a complex cavity that may deviate significantly from a cube shaped room.

In accordance with an embodiment, at operation 208 of the method 200, the room x-ray viewer module 126 may scale, deform, and position the geometric shape to align with the cavity. The alignment may include a moving of the cavity to match a center point of the shape with a center point of the cavity. The alignment may also include a scaling or deforming of the cavity to align a top of the shape to a top of the cavity, align a bottom of the shape to a bottom of the cavity, and align a middle section of the shape to walls of the cavity. In accordance with an embodiment, the alignment may include leaving a gap between a surface of the shape and a boundary of the cavity such that the shape may approach but not touch the bounds of the cavity (e.g., the shape may be positioned entirely within the cavity). For example, based on the shape being a cylinder, the cylinder may be oriented such that a first flat end of the cylinder is aligned with a floor of the cavity (e.g., aligned with a highest point of the floor), a second flat end of the cylinder is aligned with a ceiling of the cavity (e.g., aligned with a lowest point of the ceiling), and a radius of the cylinder is chosen such that the cylinder extends to a minimum bounds of the cavity (e.g., the inner bounds of the cavity). In accordance with an embodiment, the shape may be deformed in different directions (e.g., along different lateral axes) to occupy the cavity. For example, a cylindrical shape may be deformed into an oval cylinder in order to occupy a long and narrow cavity.

In accordance with an embodiment, at operation 210 of the method 200, the room x-ray viewer module 126 accesses data describing a position, an orientation, and camera view parameters (e.g., frustum parameters) for a camera in the environment (e.g., referred to herein as camera data). The camera data may describe a view of the environment from the camera. The camera may be controlled by the application 124 in order to provide a view of one or more cavities within the 3D object (e.g., controlled via input from a user and/or via code within the application). The data describing the position and orientation of the camera may be sent by the application 124 to the room x-ray viewer module 126 as part of a request from the application 124 to produce a rendered view for the camera. In accordance with an embodiment, a request for camera position and orientation data may be sent by the room x-ray viewer module 126 to the application 124.

In accordance with an embodiment, as part of operation 212 of the method 200, the room x-ray viewer module 126 creates at least three occlusion planes in the environment for a cavity with at least one occlusion plane corresponding to each of the three sections of a geometric shape as determined in operation 206 (e.g., a top section, a bottom section, and a middle section). In accordance with an embodiment, the occlusion planes may be generated only in a camera view, or alternatively, the occlusion planes may extend in the environment beyond a camera view. In accordance with an embodiment, there may be one or more occlusion planes for a ceiling or top part of the cavity (e.g., the ceiling as determined in operation 206), one or more occlusion planes for the floor or bottom part of the cavity (e.g., the floor as determined in operation 206), and one or more occlusion planes for the horizontal bounds of the cavity (e.g., walls as determined in operation 206). An occlusion plane for a section may include a single plane (or section of a plane), or a plurality of sections of planes concatenated together. Details of operation 212 for creating the occlusion planes are provided below with respect to the description of FIG. 3. In accordance with an embodiment, the at least three occlusion planes are used during a rendering of the camera view (e.g., as described with respect to operation 218 below). The at least three occlusion planes may be used as described below in operation 216 to cull (e.g., eliminate or ignore during rendering) geometry in front of the three planes (e.g., between a plane and the camera) to allow for a view into the cavity.

In accordance with an embodiment, at operation 214 of the method 200, the room x-ray viewer module 126 adjusts a position and an orientation of the at least three occlusion planes in the environment according to the camera position and orientation. The details of the positioning are described in detail with respect to FIG. 4 below.

In accordance with an embodiment, at operation 216 of the method 200, the room x-ray viewer module 126 culls any object or part of an object (e.g., geometry) in the environment which is in a line of sight between the camera and any one of the at least three occlusion planes. In addition, the room x-ray viewer module 126 may cull any object or part of an object in the environment which is in front of any one of the three occlusion planes. In accordance with an embodiment, being in front of an occlusion plane includes a volume of space extending normally (e.g., in a normal vector direction for the plane) out from the bounds of the plane. In accordance with an embodiment, culling includes removing (or ignoring) objects and geometry (e.g., a 3D model mesh) and parts of objects and geometry during a rendering (e.g., a rendering of the camera view). In accordance with an embodiment, as part of operation 216, an object may be specifically labeled so as to always be visible regardless of a position of an occlusion plane. Accordingly, such labeled objects would not be removed during culling.

In accordance with an embodiment, at operation 218 of the method 200, the room x-ray viewer module 126 renders the camera view of the environment while excluding the objects and geometry (and parts of objects and geometry) culled during operation 216. The resulting rendering provides a view from the point of view of the camera into one or more cavities in the 3D object (e.g., the one or more cavities determined in operation 204). In accordance with an embodiment, the rendering may be performed by an external process (e.g., a rendering pipeline within the rendering module 125), and whereby the room x-ray viewer module 126 provides culling information to the external process.

Figure 3:
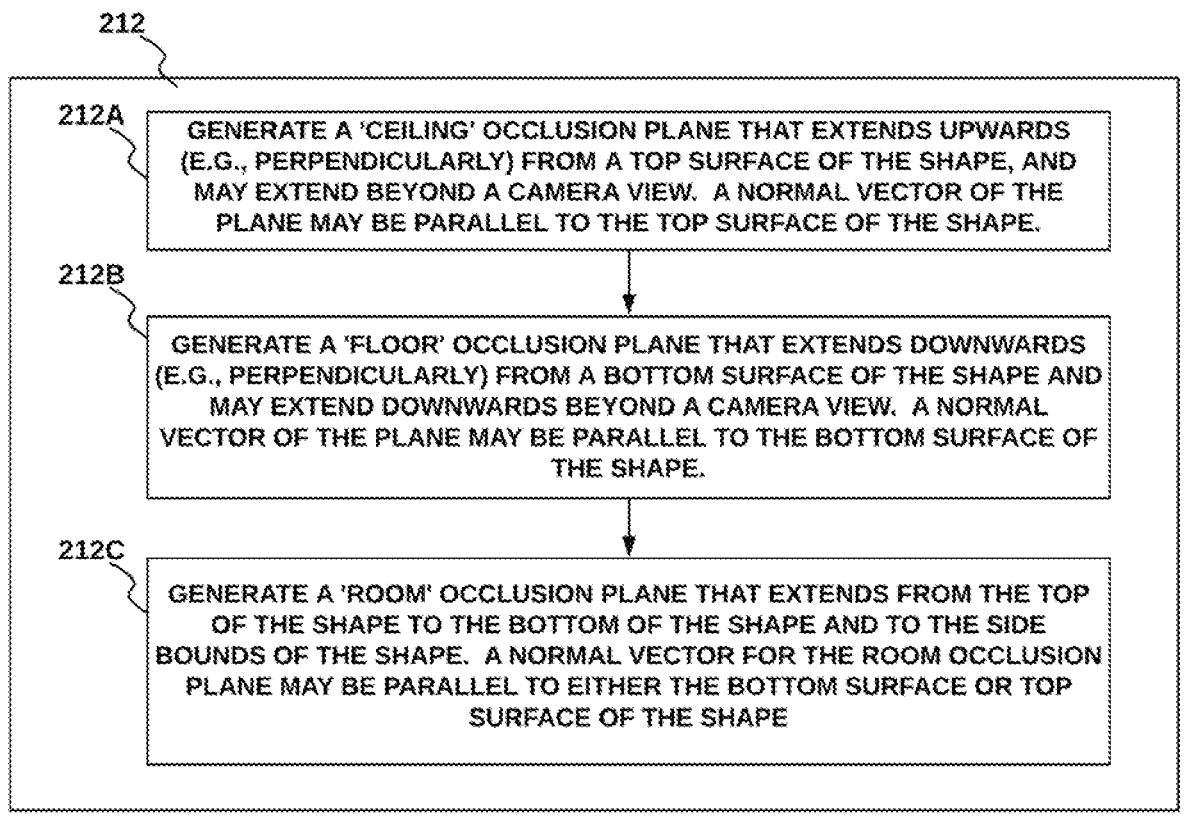
FIG. 3 is a flowchart of a method for creating occlusion planes within a room x-ray viewer system, in accordance with one embodiment.

In accordance with an embodiment, and shown in FIG. 3, are details of operation 212 for generating the at least three occlusion planes for a cavity within a 3D object. In accordance with an embodiment, at operation 212A, the room x-ray viewer module 126 generates a 'ceiling' occlusion plane that extends upwards (e.g., perpendicularly) from a top surface of the 3D shape (e.g., the 3D shape determined in operation 206), and may extend upwards beyond the camera view. In accordance with an embodiment, a position of the top of the shape is chosen and aligned (e.g., during operation 208) so that a bottom of the ceiling occlusion plane is below a ceiling of the cavity (e.g., below a lowest point of the ceiling of the cavity). In accordance with an embodiment, the ceiling occlusion plane may be oriented such that a normal vector of the plane is parallel to the top surface of the 3D shape such that objects and geometry (including parts of objects and parts of geometry) that belong to the ceiling of the cavity are in front of the plane and may be culled (e.g., ignored) based on a camera position as determined in operation 214, 216 and 218. In accordance with an embodiment, a normal vector of the ceiling occlusion plane may track a position of the camera while staying connected to the top surface of the shape. In accordance with an embodiment, the ceiling occlusion plane may extend laterally out beyond the bounds of the cavity by a fixed predetermined distance or by a predetermined percentage of the cavity size. In accordance with an embodiment, the ceiling occlusion plane may extend laterally out to infinity.

In accordance with an embodiment, at operation 212B, the room x-ray viewer module 126 generates a 'floor' occlusion plane that extends downwards (e.g., perpendicularly) from a bottom surface of the 3D shape, and may extend downwards beyond the camera view. In accordance with an embodiment, a position of the bottom of the shape is chosen and aligned (e.g., during operation 208) so that a top of the floor occlusion plane is above a floor of the cavity (e.g., above a highest point of the floor for the cavity). In accordance with an embodiment, the floor occlusion plane may be oriented such that a normal vector of the plane is parallel to the bottom surface of the shape such that objects and geometry (including parts of objects and parts of geometry) that belong to the floor of the cavity are in front of the floor occlusion plane and may be culled (e.g., ignored) based on a camera position as determined in operation 214, 216 and 218. In accordance with an embodiment, a normal vector of the plane may track a position of the camera while staying connected to the bottom surface of the 3D shape. In accordance with an embodiment, the floor occlusion plane may extend laterally out beyond the bounds of the cavity by a fixed predetermined distance or by a predetermined percentage of the cavity size. In accordance with an embodiment, the floor occlusion plane may extend laterally out to infinity.

In accordance with an embodiment, at operation 212C, the room x-ray viewer module 126 generates a 'room' occlusion plane that extends from the top of the 3D shape to the bottom of the 3D shape. In accordance with an embodiment, a normal vector of the room occlusion plane may be parallel to either the top or the bottom surface of the 3D shape. In accordance with an embodiment, a normal vector of the room occlusion plane may track a position of the camera while staying connected to one or both of the top and the bottom surface of the shape. In accordance with an embodiment, the room occlusion plane may extend laterally out beyond the bounds of the cavity by a fixed predetermined distance or by a predetermined percentage of the cavity size. In accordance with an embodiment, the room occlusion plane may extend laterally out to infinity.

In accordance with an embodiment, while FIG. 3 shows the operations 212A, 212B and 212C as being performed sequentially, some of the operations 212A, 212B and 212C may be performed in concurrently, in a different order than shown, or may be omitted.

Figure 4:
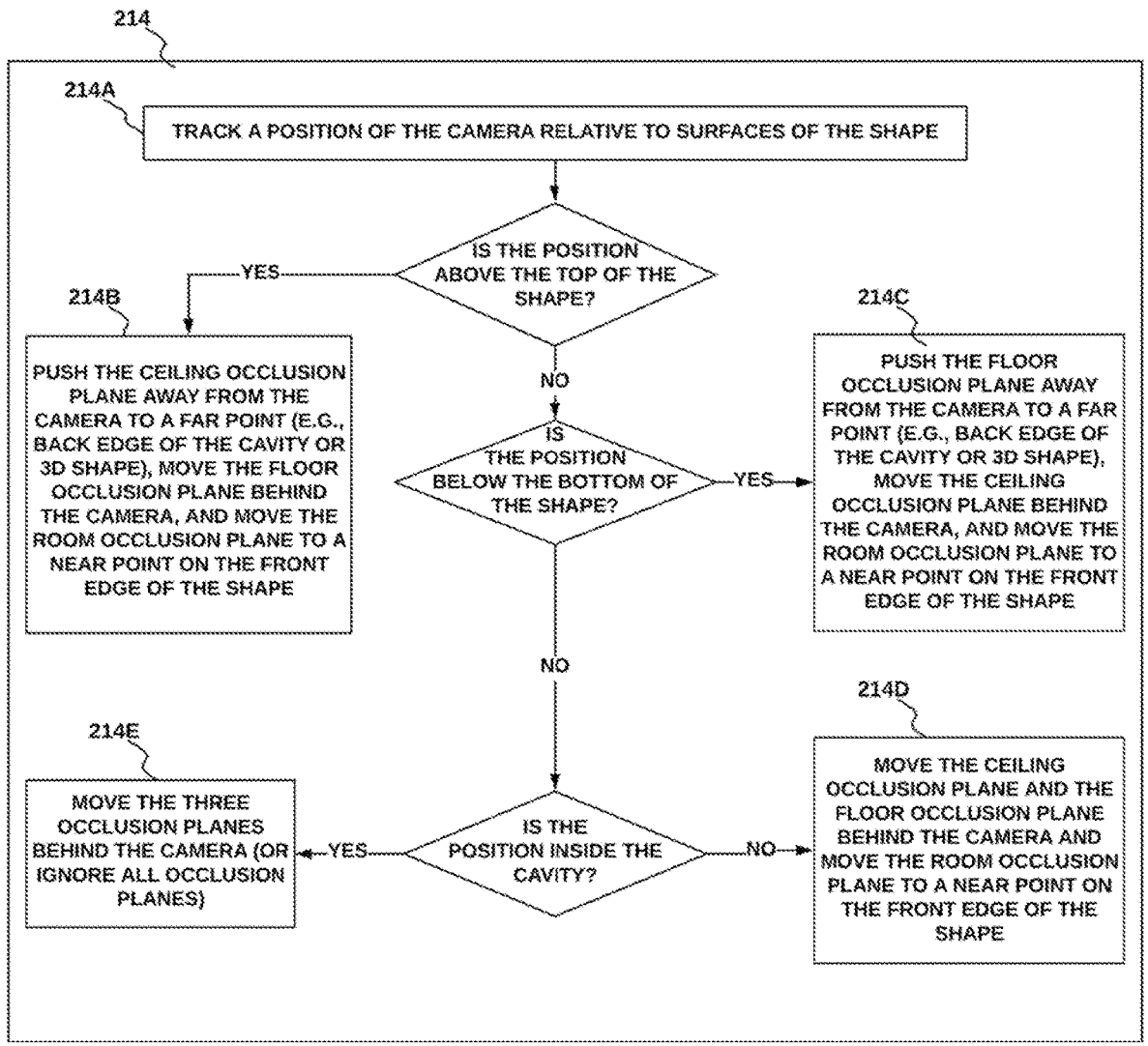
FIG. 4 is a flowchart illustrating a method for positioning occlusion planes within a room x-ray viewer, in accordance with an embodiment.

In accordance with an embodiment, and shown in FIG. 4, are details of operation 214 for positioning the three occlusion planes. In accordance with an embodiment, at operation 214A, the room x-ray viewer module 126 tracks a position and orientation of the camera (e.g., the camera from operation 210) relative to surfaces of the 3D shape. In accordance with an embodiment, at operation 214B, based on the position of the camera being above a top surface of the 3D shape, the room x-ray viewer module 126 performs the following: moving the ceiling occlusion plane away from the camera to a far point, moving the floor occlusion plane behind the camera (e.g., to ignore the floor occlusion plane), and moving the room occlusion plane to a near point on the 3D shape. The near point may be a point on the 3D shape which is closest to the camera position. In accordance with an embodiment, the far point may be a point on the 3D shape which is farthest to the camera position. In accordance with an embodiment, the far point may be a point in the cavity which is farthest to the camera position. In accordance with an embodiment, the room occlusion plane may be rotated to face the camera. Operation 214B may be used to eliminate a rendering of the top part of the cavity (and objects above the cavity) to allow a downwards view into the cavity from above the cavity ceiling, as if to look into the cavity through a glass ceiling (e.g., a dollbox view).

In accordance with an embodiment, at operation 214C, based on the position of the camera being below the bottom surface of the 3D shape, the room x-ray viewer module 126 performs the following: moving the floor occlusion plane away from the camera to a far point, moving the ceiling occlusion plane behind the camera (e.g., to ignore the ceiling occlusion plane), and moving the room occlusion plane to a near point on the shape. The near point may be a point on the shape which is closest to the camera position. In accordance with an embodiment, the far point may be a point on the 3D shape which is farthest to the camera position. In accordance with an embodiment, the far point may be a point in the cavity which is farthest to the camera position. In accordance with an embodiment, the room occlusion plane may be rotated to face the camera. Operation 214C may be used to eliminate a rendering of the bottom part of the cavity (and objects below the cavity) to allow a view up into the cavity from below the cavity floor, as if to look into the cavity through a glass floor.

In accordance with an embodiment, at operation 214D, based on the position of the camera being above the bottom surface of the 3D shape and below the top surface of the 3D shape and outside of the cavity, the room x-ray viewer module 126 performs the following: moving the ceiling occlusion plane and the floor occlusion plane behind the camera (e.g., to ignore the ceiling occlusion plane and the floor occlusion plane), and moving the room occlusion plane to a near point on the 3D shape. The near point may be a point on the shape which is closest to the camera position. In accordance with an embodiment, the room occlusion plane may be rotated to face the camera. Operation 214D may be used to eliminate a rendering of a lateral section of the cavity (and objects between the lateral section and the camera) to see into the cavity, as if to look into the cavity through a glass wall, while the ceiling and floor of the cavity remain rendered.

In accordance with an embodiment, at operation 214E, based on the position of the camera being above the bottom surface of the 3D shape and below the top surface of the 3D shape and inside of the cavity, the room x-ray viewer module 126 performs the following: moving the ceiling occlusion plane, the floor occlusion plane and the room occlusion plane behind the camera (e.g., to ignore the ceiling occlusion plane, the floor occlusion plane, and the room occlusion plane). With this positioning of the three occlusion planes, a rendering ignores all the occlusion planes and renders the inside of the cavity such that all surfaces internal to the cavity are visible.

Figure 5:
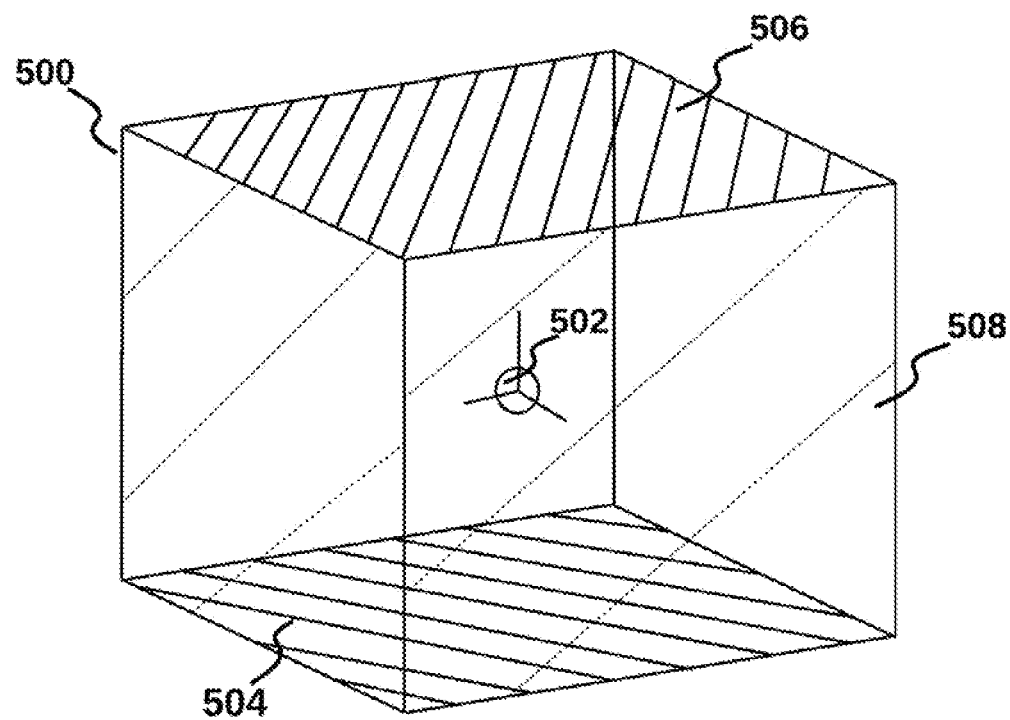
FIG. 5 is an illustration of an example cavity within a room x-ray viewer system, in accordance with an embodiment.

In accordance with an embodiment, FIG. 5 shows an example of a cavity 500 as determined in operation 204 of the method 200. The cavity 500 has a cube shape and may represent a room within a building, a cabin within a cruise ship, and more. While the cavity 500 in FIG. 5 is shown with a cube shape, a cavity within the method 200 may have any regular or irregular shape without deviating from the scope of the disclosure. According to operation 204 and as shown in FIG. 5, a cavity 500 may be described by a room center 502, a floor height 504, a ceiling height 506 and interior bounds 508 (e.g., walls).

Figure 6:
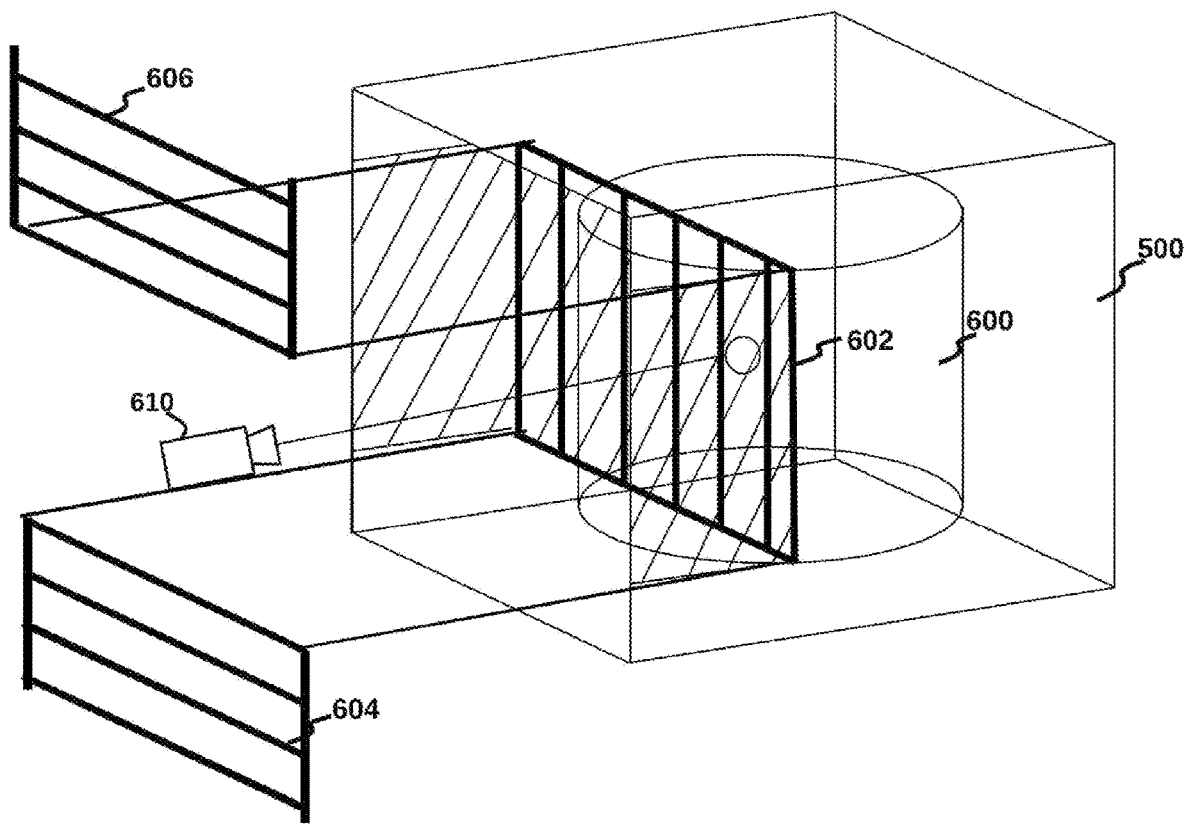
FIG. 6 is an illustration of an example cavity and three occlusion planes within a room x-ray viewer system, in accordance with an embodiment.

In accordance with an example embodiment, FIG. 6 shows a cavity 500 with an associated geometric shape 600 and occlusion planes (602, 604, and 606). The cavity 500 may be similar to the cavity 500 shown in FIG. 5. In the example embodiment shown in FIG. 6, the geometric shape 600 is a cylinder. In accordance with an embodiment, the cylindrical geometric shape 600 is associated with an interior of the cavity 500 according to operation 206 and operation 208. In FIG. 6, a camera 610 is shown which is positioned according to data gathered in operation 210. In the example shown in FIG. 6, the camera 610 is positioned at a same height as the room center, in front of the cavity and pointed at the room center for simplicity of explanation; however, the camera 610 may be positioned anywhere in an environment and pointed anywhere within the cavity 500 or outside of the cavity without departing from the scope of the disclosure. In accordance with an embodiment, FIG. 6 illustrates an example of room occlusion plane positioning as described with respect to operation 214D wherein the floor occlusion plane 604 is positioned behind the camera 610, the ceiling occlusion plane 606 is positioned behind the camera 610, and the room occlusion plane 602 is positioned on a near point of the front edge of the cylinder 600. In the example embodiment shown in FIG. 6, a clipping zone (shown with hash lines) represents a zone where objects and geometry are culled from rendering as described in operation 216. While the occlusion planes shown in FIG. 6 are shown with definite lateral boundaries, it should be understood by those skilled in the art that this does not limit the disclosure herein, and that occlusion planes can have defined lateral boundaries or may extend indefinitely.

Figure 7:
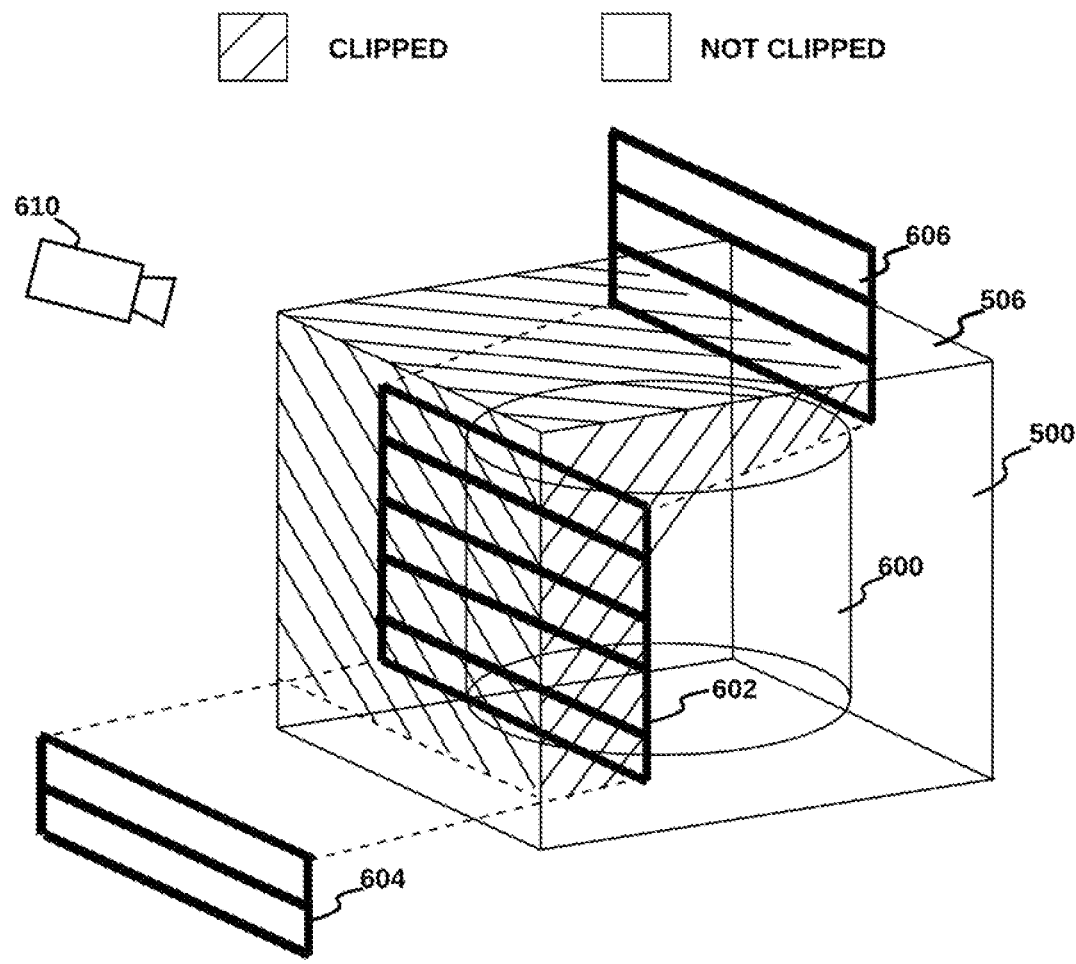
FIG. 7 is an illustration of an example cavity and three occlusion planes within a room x-ray viewer system, in accordance with an embodiment.

In accordance with an example embodiment, FIG. 7 shows a cavity 500 with an associated geometric shape 600 and occlusion planes (602, 604, and 606). The cavity 500 may be similar to the cavity 500 shown in FIG. 5 and FIG. 6, and the shape 600 may be similar to the shape 600 shown in FIG. 6. In the example shown in FIG. 7, a camera 610 is positioned above a top of the shape 600, above a ceiling 506 of the cavity 500, and in front of the cavity 500 and pointed at a room center (e.g., a center of the cavity). In accordance with an embodiment, FIG. 7 illustrates an example of room occlusion plane positioning as described with respect to operation 214B wherein a floor occlusion plane 604 is positioned behind the camera 610, a ceiling occlusion plane 606 is positioned at a far point (e.g., a back edge of the cylinder 600), and a room occlusion plane 602 is positioned on a near point of the front edge of the cylinder 600. In the example embodiment shown in FIG. 7, a clipping zone (shown with hash lines) represents a zone where objects and geometry are culled from rendering as described in operation 216. While the occlusion planes shown in FIG. 7 are shown with definite lateral boundaries, it should be understood by those skilled in the art that this does not limit the disclosure herein, and that occlusion planes can have defined lateral boundaries or may extend indefinitely.

Figure 8:
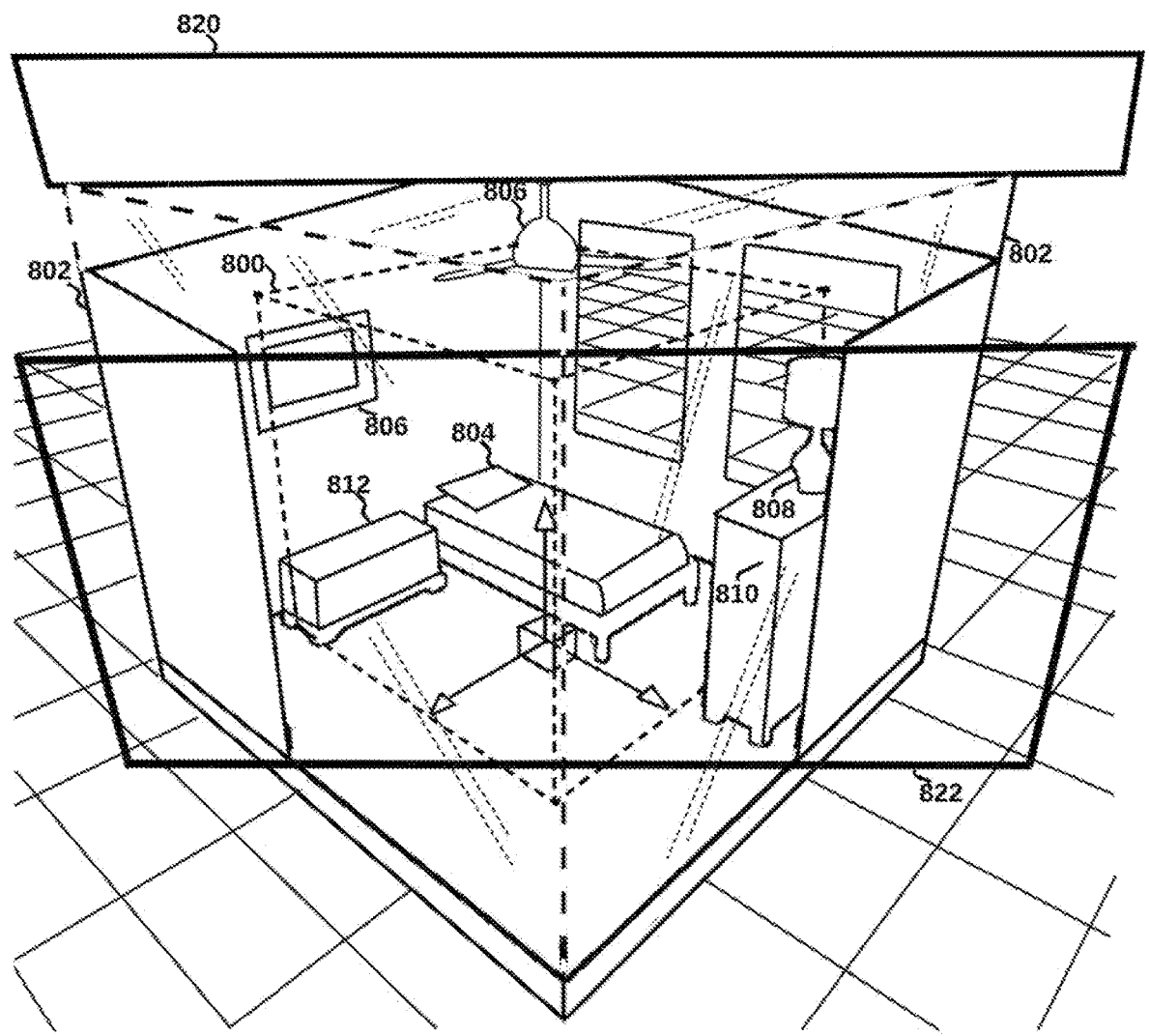
FIG. 8 is an illustration of an example bedroom digital object with an associated cavity and occlusion planes, in accordance with an embodiment.

In accordance with an example embodiment, FIG. 8 shows a bedroom digital object cavity 802 (or 'bedroom cavity 802') with an associated 3D shape 800 and occlusion planes (820 and 822). In accordance with an embodiment, the bedroom digital object 802 is a cavity. In the example embodiment, a bed 804, a wall portrait 806, a fan 806, a lamp 808, a first drawer 810 and a second drawer 812 are associated with an interior of the bedroom cavity 802. In accordance with an embodiment, the 3D shape 800 is associated with the bedroom cavity 802 according to operation 206 and 208 (e.g., as described with respect to the method 200 in FIG. 2 and FIG. 3). In the example shown in FIG. 8, a camera (similar to the camera 610 shown in FIG. 6 and FIG. 7, but not specifically shown in FIG. 8) is positioned exterior to a corner of the 3D shape 800, above a ceiling height of the 3D shape 800 and pointed at a room center (e.g., with the camera oriented with a perspective of a viewer of FIG. 8). The position and orientation of the camera in FIG. 8 is for simplicity of explanation only; the camera may be positioned anywhere in an environment surrounding the bedroom cavity 802 and pointed anywhere within the cavity 802 or outside the cavity 802 without departing from the scope of the disclosure. In accordance with an embodiment, FIG. 8 illustrates an example of a floor occlusion plane positioning as described with respect to operation 214B, wherein a ceiling occlusion plane 820 is positioned away from the camera 610 to a far point of the 3D shape 800, a floor occlusion plane (not visible in FIG. 8) is positioned behind the camera 610, and a room occlusion plane 822 is positioned on a near point of the front edge of the 3D shape 800. While the occlusion planes shown in FIG. 8 are shown with definite lateral boundaries, it should be understood by those skilled in the art that this does not limit the disclosure herein, and that occlusion planes can have defined lateral boundaries or may extend indefinitely.

In accordance with another embodiment, based on there being more than one cavity in a camera view, operation 212 may be performed separately for each cavity in the camera view to create a set of three occlusion planes for each of the more than one cavities. Furthermore, during operation 214 in accordance with an embodiment, each set of three occlusion planes may be combined into a single set of three large combined occlusion planes for culling geometry for a rendering. The combining may be done by interpolation of the edges of the occlusion planes based on a position and direction of a camera between two sets of three occlusion planes.

Figure 9A:
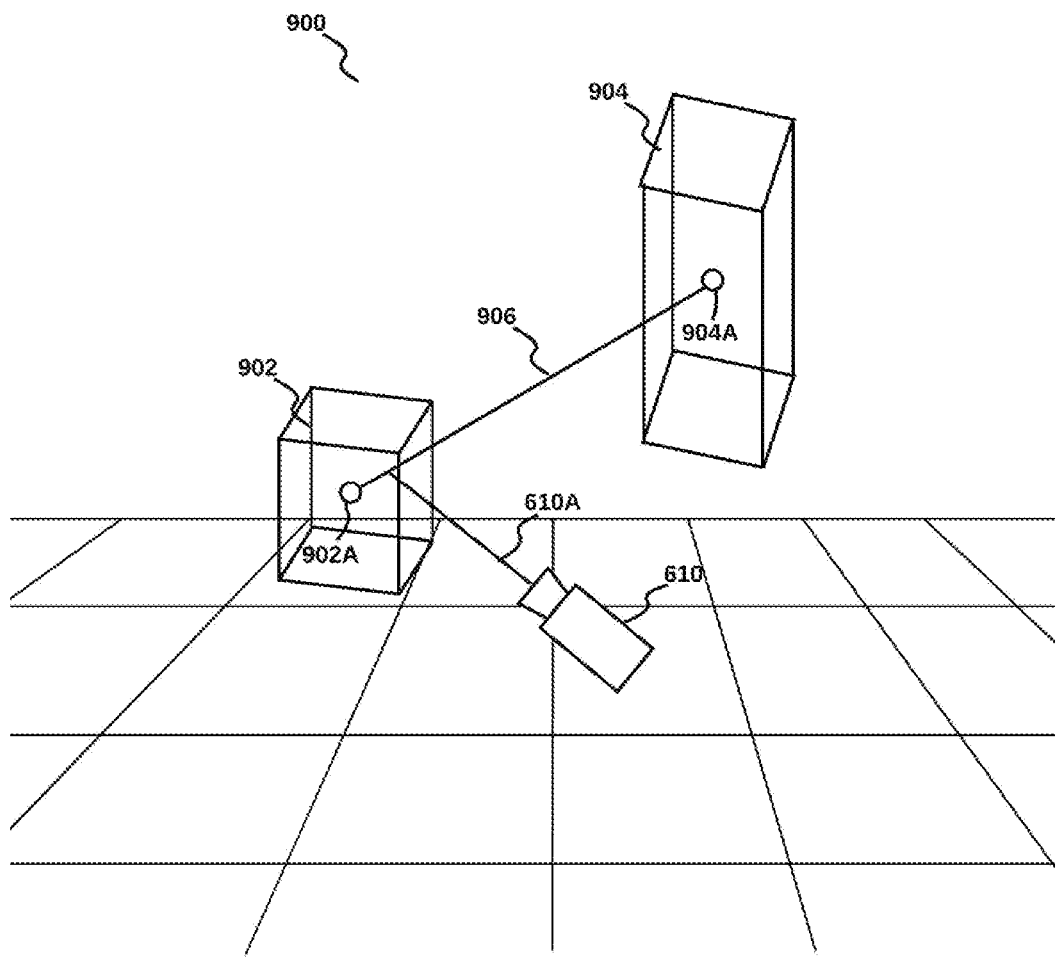
FIG. 9A is an illustration of an example environment with two cavities in a room x-ray viewer system, in accordance with an embodiment.

In accordance with an embodiment, based on there being more than one cavity in the view, operation 212 may be performed separately for each cavity in the camera view to create a set of three occlusion planes for each of the more than one cavities. Each set of three occlusion planes may be positioned separately during operation 214 based on the position, size and orientation of the cavity for which they were created. Furthermore, each set of three occlusion planes that were created and positioned for a cavity of the more than one cavities may then be used separately for culling geometry related to the cavity in operation 216 prior to a rendering in operation 218. In accordance with an embodiment, there may be one or more 'active' cavities of the more than one cavity whereby an active cavity is determined by a threshold proximity of a cavity to the optic axis of the camera (e.g., gaze). The occlusion planes associated with the active cavity are used for culling in operation 216 while the occlusion planes for non-active cavities may be ignored in operation 216. In accordance with an embodiment, and shown in FIG. 9A, is an environment 900 with a first cavity 902, an associated first room center 902A, a second cavity 904, and an associated second room center 904A. An optic axis 610A (e.g., gaze) of a camera 610 is measured along an imaginary line 906 connecting the first room center 902A and the second room center 904A. While the optic axis 610A passes through the first cavity 902 or is within a threshold distance of the first cavity 902, then the first cavity is determined to be the 'active' cavity and occlusion planes associated of the first cavity 902 are used in operation 216.

Figure 9B:
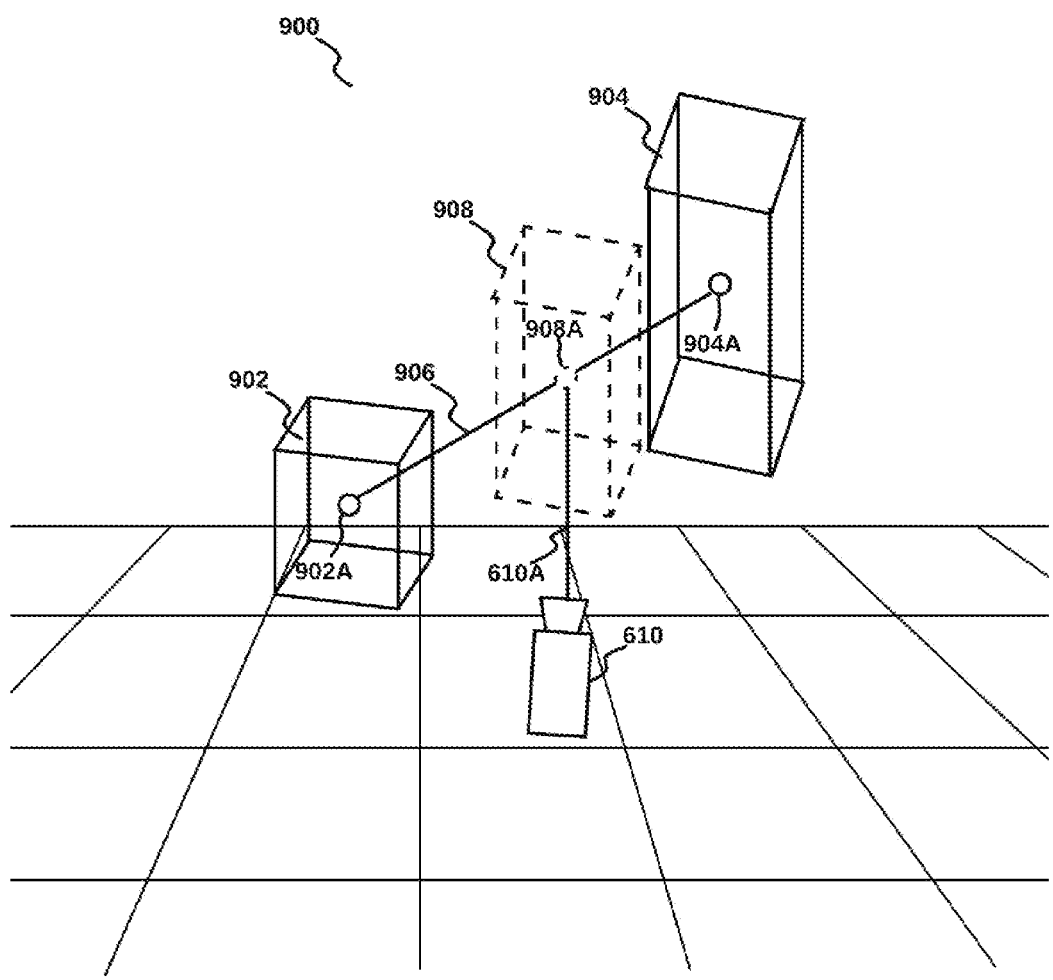
FIG. 9B is an illustration of an example environment with two cavities showing an interpolated 'active' cavity within a room x-ray viewer system, in accordance with an embodiment.

In accordance with an embodiment, and shown in FIG. 9B, based on an optic axis 610A of the camera 610 being between two cavities (902 and 904), the room x-ray viewer module 126 may generate an imaginary 'active' cavity 908 which is a cavity with a size that is an interpolation of the first cavity 902 and the second cavity 904. For example, the interpolation may be a linear interpolation based on the distance of the optic axis 610A along a line 906 connecting the first room center 902A and the second room center 904A. The room x-ray viewer module 126 may also create occlusion planes for the imaginary 'active' cavity according to operation 212 and position the created occlusion planes according to operation 214. The occlusion planes associated with the imaginary 'active' cavity are used for culling in operation 216 while the occlusion planes for non-active cavities (e.g., the first cavity 902 and the second cavity 904) may be ignored in operation 216.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 10:
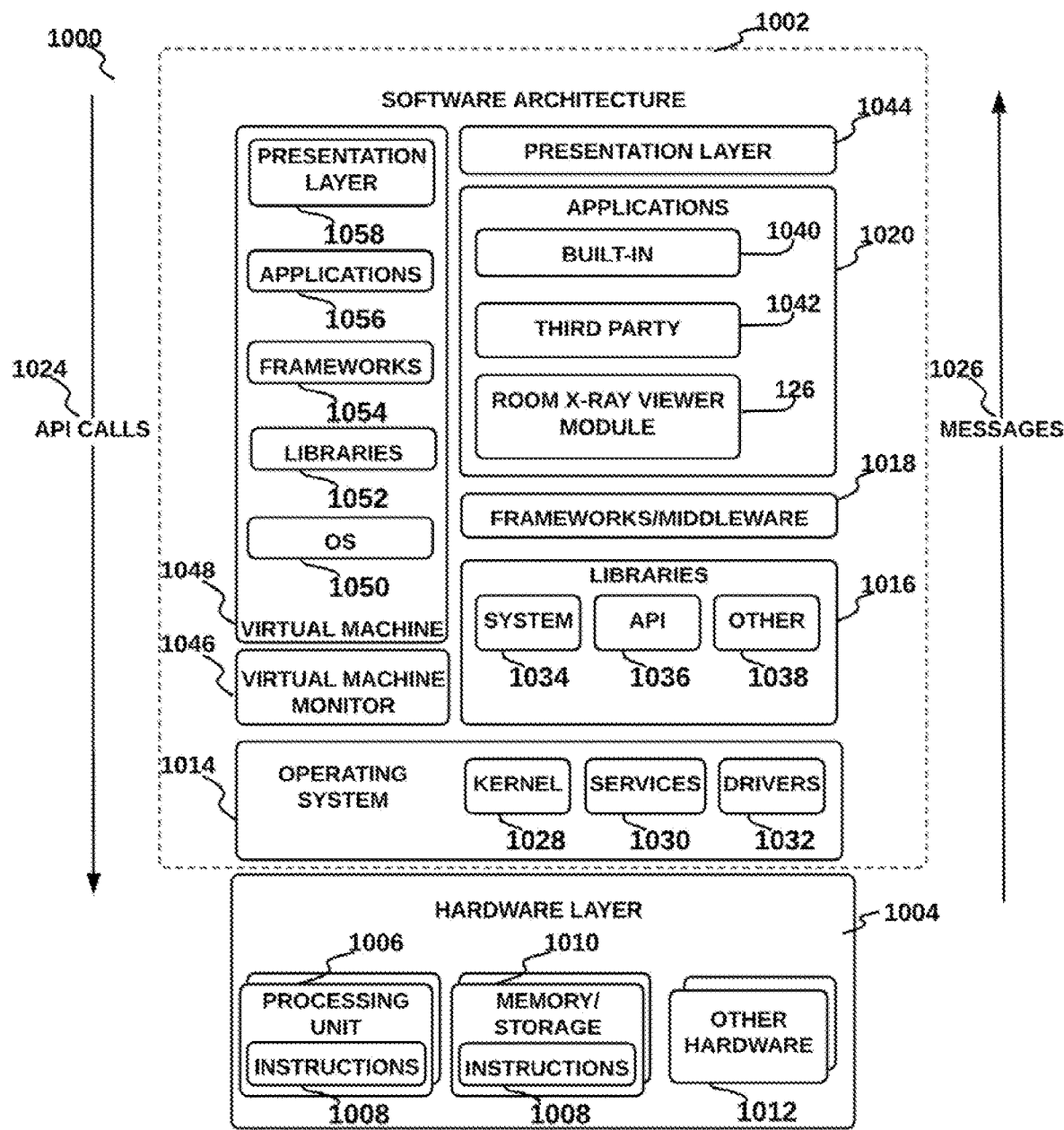
FIG. 10 is a block diagram illustrating an example software architecture, which may be used in conjunction with various hardware architectures described herein.

FIG. 10 is a block diagram 1000 illustrating an example software architecture 1002, which may be used in conjunction with various hardware architectures herein described to provide a gaming engine 1001 and/or components of the room x-ray viewer system 100. FIG. 10 is a non-limiting example of a software architecture and it will be appreciated that many other architectures may be implemented to facilitate the functionality described herein. The software architecture 1002 may execute on hardware such as a machine

Figure 11:
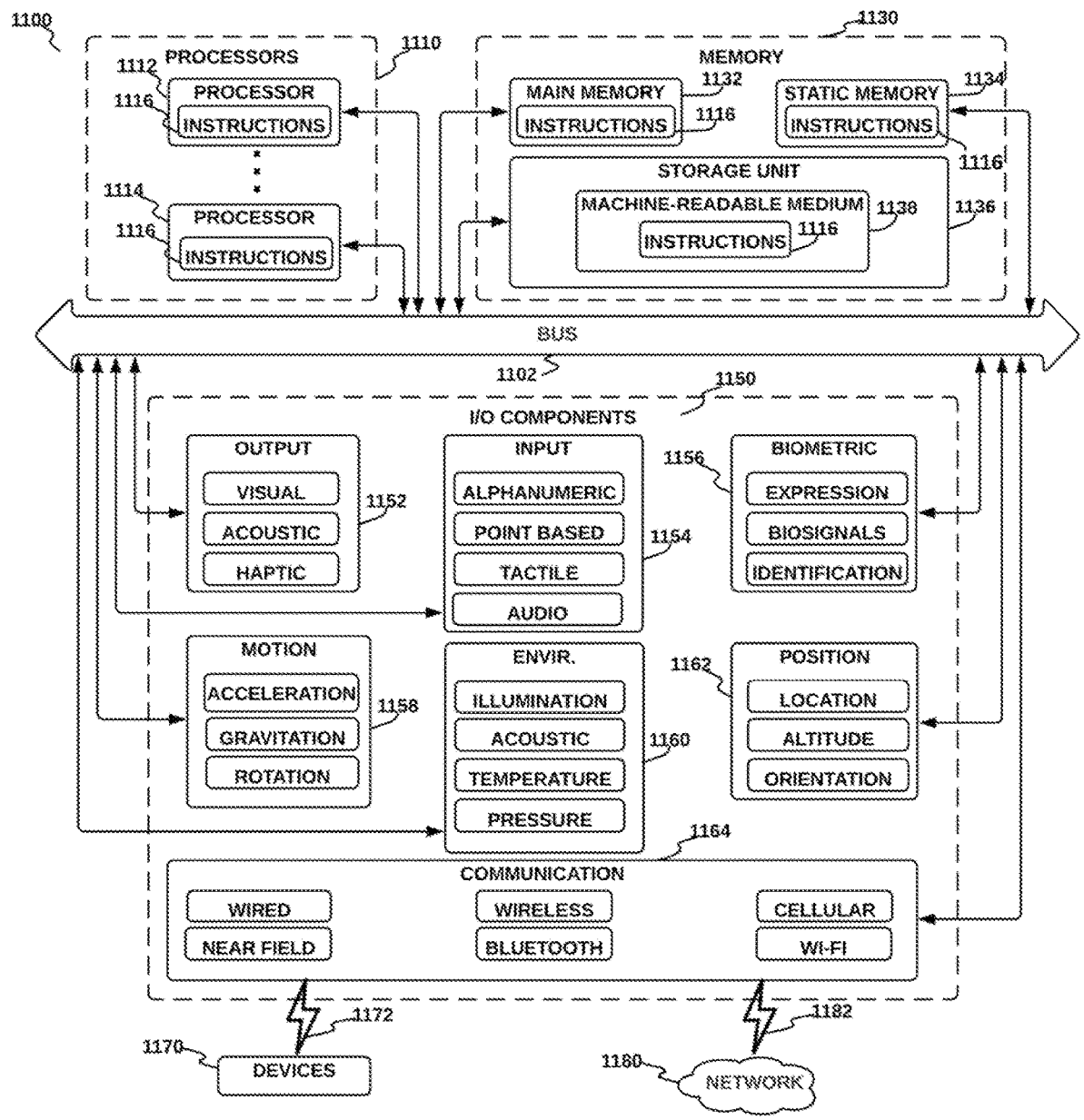
FIG. 11 is a block diagram illustrating components of a machine, according to some example embodiments, configured to read instructions from a machine-readable medium (e.g., a machine-readable storage medium) and perform any one or more of the methodologies discussed herein.

1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 having associated executable instructions 1008. The executable instructions 1008 represent the executable instructions of the software architecture 1002, including implementation of the methods, modules and so forth described herein. The hardware layer 1004 also includes memory/storage 1010, which also includes the executable instructions 1008. The hardware layer 1004 may also comprise other hardware 1012.

In the example architecture of FIG. 10, the software architecture 1002 may be conceptualized as a stack of layers where each layer provides particular functionality. For example, the software architecture 1002 may include layers such as an operating system 1014, libraries 1016, frameworks or middleware 1018, applications 1020 and a presentation layer 1044. Operationally, the applications 1020 and/or other components within the layers may invoke application programming interface (API) calls 1024 through the software stack and receive a response as messages 1026. The layers illustrated are representative in nature and not all software architectures have all layers. For example, some mobile or special purpose operating systems may not provide the frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1116 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) provide a higher-level common infrastructure that may be used by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1042 may invoke the API calls 1024 provided by the mobile operating system such as operating system 1014 to facilitate functionality described herein.

The applications 1020 may use built-in operating system functions (e.g., kernel 1028, services 1030 and/or drivers 1032), libraries 1016, or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. In the example of FIG. 10, this is illustrated by a virtual machine 1048. The virtual machine 1048 creates a software environment where applications/modules can execute as if they were executing on a hardware machine (such as the machine 1100 of FIG. 11, for example). The virtual machine 1048 is hosted by a host operating system (e.g., operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system (OS) 1050, libraries 1052, frameworks 1054, applications 1056, and/or a presentation layer 1058. These layers of software architecture executing within the virtual machine 1048 can be the same as corresponding layers previously described or may be different.

FIG. 11 is a block diagram illustrating components of a machine 1100, according to some example embodiments, configured to read instructions from a machine-readable medium (e.g., a machine-readable storage medium) and perform any one or more of the methodologies discussed herein. In some embodiments, the machine 1100 is similar to the room x-ray viewer device 104. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. As such, the instructions 1116 may be used to implement modules or components described herein. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute the instructions 1116 to perform any one or more of the methodologies discussed herein.

The machine 1100 may include processors 1110, memory 1130, and input/output (I/O) components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory/storage 1130 may include a memory, such as a main memory 1132, a static memory 1134, or other memory, and a storage unit 1136, both accessible to the processors 1110 such as via the bus 1102. The storage unit 1136 and memory 1132, 1134 store the instructions 1116 embodying any one or more of the methodologies or functions described herein. The instructions 1116 may also reside, completely or partially, within the memory 1132, 1134, within the storage unit 1136, within at least one of the processors 1110 (e.g., within the processor's cache memory), or any suitable combination thereof, during execution thereof by the machine 1100. Accordingly, the memory 1132, 1134, the storage unit 1136, and the memory of processors 1110 are examples of machine-readable media 1138.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1150 may include a wide variety of components to receive input, provide output, produce output, transmit information, exchange information, capture measurements, and so on. The specific input/output (I/O) components 1150 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1150 may include many other components that are not shown in FIG. 11. The input/output (I/O) components 1150 are grouped according to functionality merely for simplifying the following discussion and the grouping is in no way limiting. In various example embodiments, the input/output (I/O) components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1150 may include communication components 1164 operable to couple the machine 1100 to a network 1180 or devices 1170 via a coupling 1182 and a coupling 1172 respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1162, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories;
   a set of instructions stored in the one or more computer memories, the set of instructions configuring the one or more computer processors to perform operations comprising:
   determining an interior cavity of an object in a view;
   determining a geometric shape that represents the interior cavity;
   creating three occlusion planes associated with the geometric shape that represents the interior cavity;
   positioning the three occlusion planes based on the geometric shape and on a camera position and orientation;
   culling any objects or parts of objects that are in a line of sight between the camera and any one of the three occlusion planes; and
   rendering the view from the perspective of the camera.

2. The system of claim 1, wherein the object in the view consists of point cloud or mesh data.

3. The system of claim 1, wherein the three occlusion planes include a ceiling occlusion plane that extends from a top surface of the geometric shape that is aligned with the cavity.

4. The system of claim 1, wherein the three occlusion planes include a floor occlusion plane that extends from a bottom surface of the geometric shape that is aligned with the cavity.

5. The system of claim 1, wherein the three occlusion planes include a room occlusion plane that extends from a top surface of the geometric shape that is aligned with the cavity to a bottom surface of the three dimensional geometric shape.

6. The system of claim 1, wherein the positioning of the three occlusion planes includes the following operations:
based on the camera position being above a top surface of the geometric shape that is aligned with the cavity, moving the ceiling occlusion plane away from a view of the camera;
moving the floor occlusion plane behind the view of the camera; and
moving the room occlusion plane to a point on the geometric shape.

7. The system of claim 1, wherein the positioning of the three occlusion planes includes the following operations:
based on the position of the camera being below a bottom surface of the geometric shape that is aligned with the cavity, moving a floor occlusion plane of the three occlusion planes away from a view of the camera;
moving a ceiling occlusion plane of the three occlusion planes behind the view of the camera; and
moving a room occlusion plane of the three occlusion planes to a point on the geometric shape.

8. The system of claim 1, wherein the positioning of the three occlusion planes includes the following operations:
based on the camera position being above a bottom surface of the geometric shape that is aligned with the cavity and below a top surface of the geometric shape, moving a ceiling occlusion plane of the three occlusion planes and a floor occlusion plane of the three occlusion planes behind a view of the camera; and
moving a room occlusion plane of the three occlusion planes to a point on the geometric shape.

9. The system of claim 1, wherein one of the three occlusion planes is subdivided into two or more occlusion planes.

10. A non-transitory computer-readable storage medium storing a set of instructions that, when executed by one or more computer processors, causes the one or more computer processors to perform operations, the operations comprising:
determining an interior cavity of an object in a view;
determining a geometric shape that represents the interior cavity;
creating three occlusion planes associated with the geometric shape that represents the interior cavity;
positioning the three occlusion planes based on a camera position and orientation;
culling any objects or parts of objects that are in a line of sight between the camera and any one of the three occlusion planes; and
rendering the view from the perspective of the camera.

11. The non-transitory computer-readable storage medium of claim 10, wherein the object in the view consists of point cloud or mesh data.

12. The non-transitory computer-readable storage medium of claim 10, wherein the three occlusion planes include a ceiling occlusion plane that extends from a top surface of the geometric shape that is aligned with the cavity.

13. The non-transitory computer-readable storage medium of claim 10, wherein the three occlusion planes include a floor occlusion plane that extends from a bottom surface of the geometric shape that is aligned with the cavity.

14. The non-transitory computer-readable storage medium of claim 10, wherein the three occlusion planes include a room occlusion plane that extends from a top surface of a geometric shape that is aligned with the cavity to a bottom surface of geometric shape.

15. The non-transitory computer-readable storage medium of claim 10, wherein the positioning of the three occlusion planes includes the following operations:
based on the camera position being above a top surface of the geometric shape that is aligned with the cavity, moving the ceiling occlusion plane away from a view of the camera;
moving the floor occlusion plane behind the view of the camera; and
moving the room occlusion plane to a point on the geometric shape.

16. The non-transitory computer-readable storage medium of claim 10, wherein the positioning of the three occlusion planes includes the following operations:
based on the position of the camera being below a bottom surface of the geometric shape that is aligned with the cavity, moving a floor occlusion plane of the three occlusion planes away from a view of the camera;
moving a ceiling occlusion plane of the three occlusion planes behind the view of the camera; and
moving a room occlusion plane of the three occlusion planes to a point on the geometric shape.

17. The non-transitory computer-readable storage medium of claim 10, wherein the positioning of the three occlusion planes includes the following operations:
based on the camera position being above a bottom surface of the geometric shape that is aligned with the cavity and below a top surface of the geometric shape, moving a ceiling occlusion plane of the three occlusion planes and a floor occlusion plane of the three occlusion planes behind a view of the camera; and
moving a room occlusion plane of the three occlusion planes to a point on the geometric shape.

18. The non-transitory computer-readable storage medium of claim 10, wherein one of the three occlusion planes is subdivided into two or more occlusion planes.

19. A method comprising:
determining an interior cavity of an object in a view;
determining a geometric shape that represents the interior cavity;
creating three occlusion planes associated with the geometric shape that represents the interior cavity;
positioning the three occlusion planes based on a camera position and orientation;
culling any objects or parts of objects that are in a line of sight between the camera and any one of the three occlusion planes; and
rendering the view from the perspective of the camera.

20. The method of claim 19, wherein the three occlusion planes include the following:
a ceiling occlusion plane that extends from a top surface of the geometric shape that is aligned with the cavity;
a floor occlusion plane that extends from a bottom surface of the geometric shape; and
a room occlusion plane that extends from a top surface of the geometric shape to a bottom surface of the geometrical shape.

* * * * *